May 16, 1939.  E. HUFF  2,158,423
METHOD OF AND APPARATUS FOR GRINDING TOOTHED WHEELS
Filed Nov. 3, 1937  3 Sheets-Sheet 1
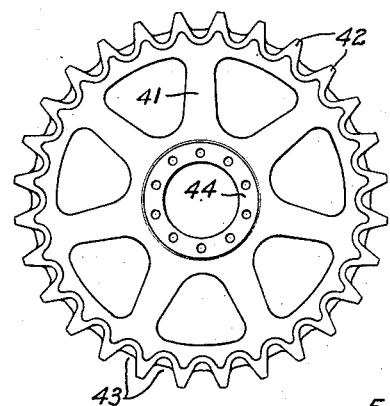
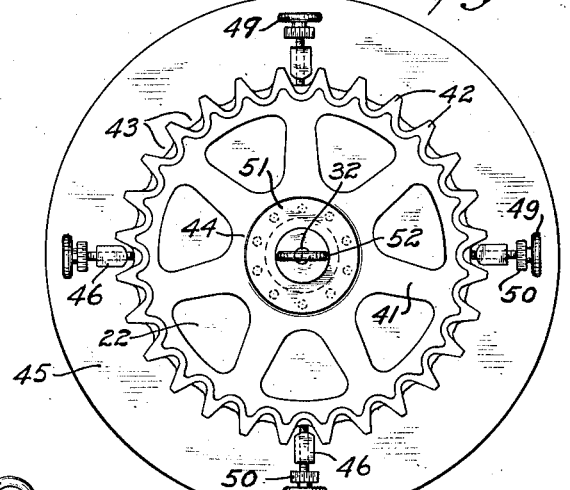
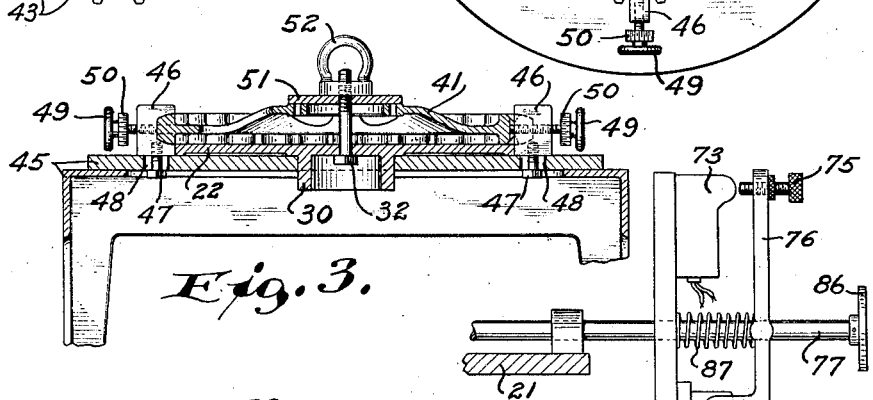
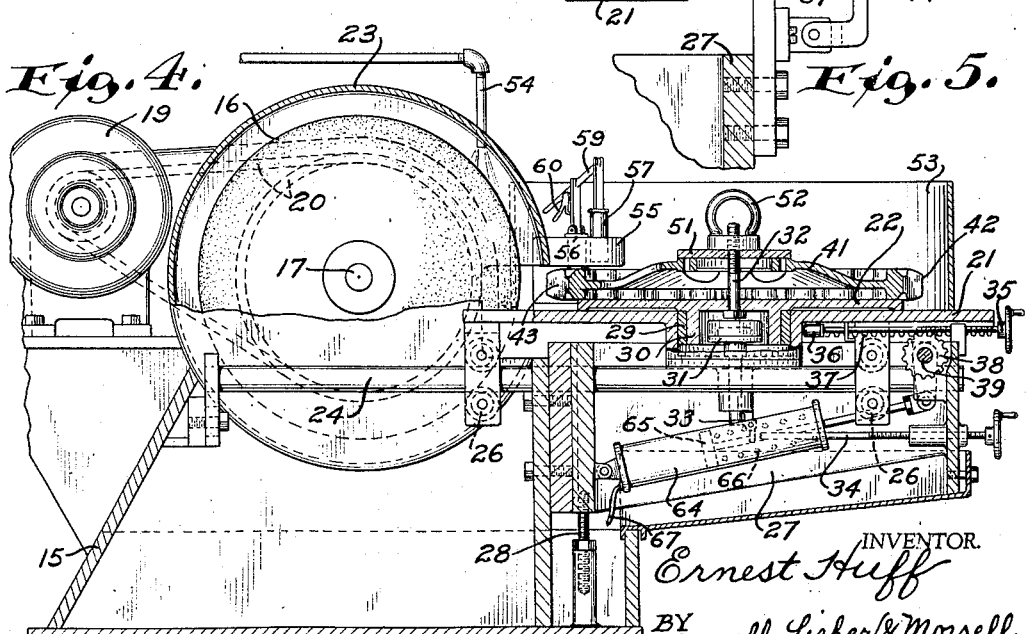
INVENTOR.
Ernest Huff
BY Morsell, Lieber & Morsell
ATTORNEYS.

May 16, 1939.  E. HUFF  2,158,423
METHOD OF AND APPARATUS FOR GRINDING TOOTHED WHEELS
Filed Nov. 3, 1937  3 Sheets-Sheet 2
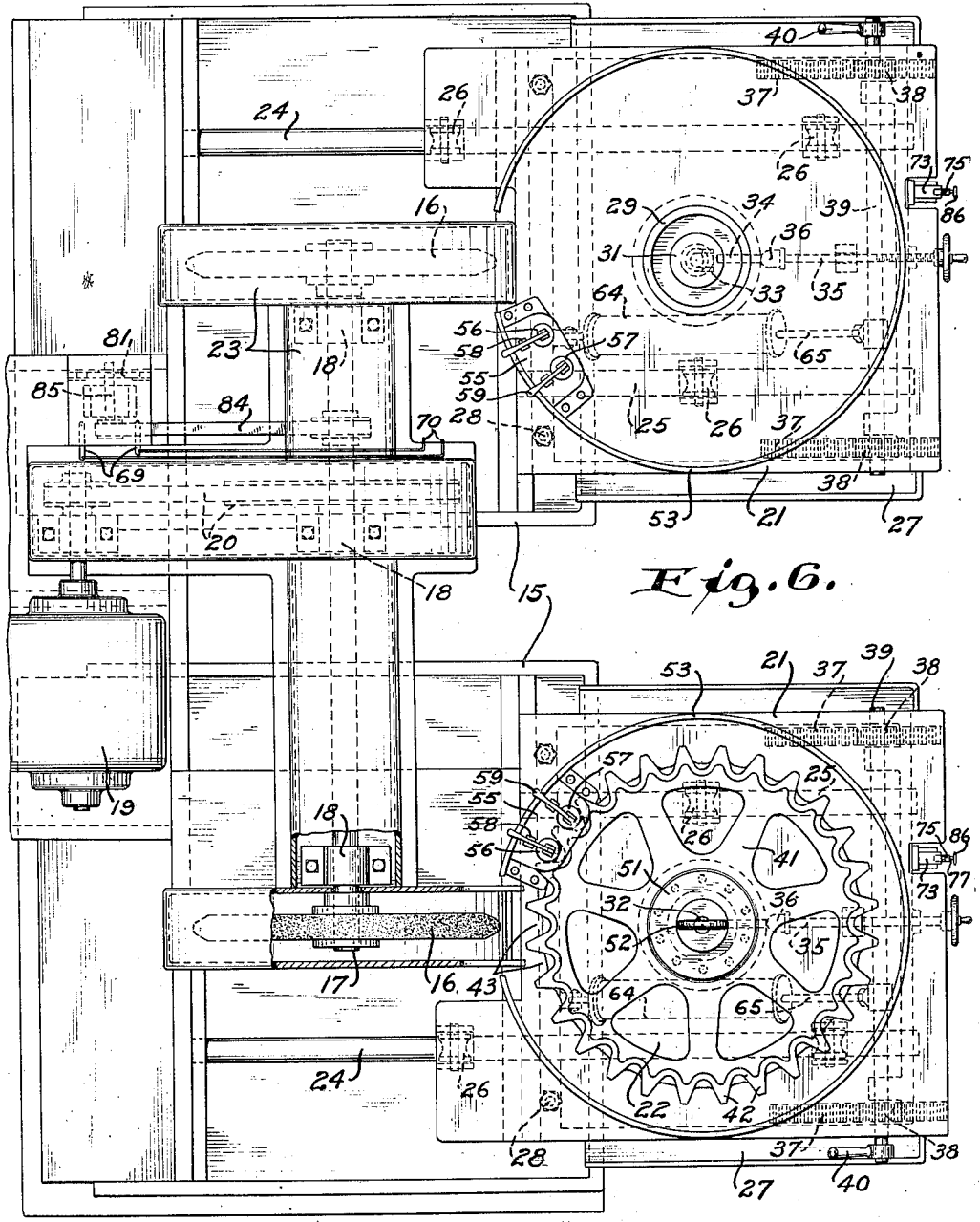
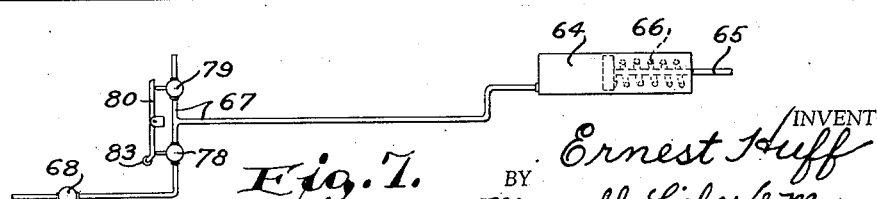
INVENTOR.
Ernest Huff
BY Morsell, Lieber & Morsell
ATTORNEYS.

May 16, 1939.  E. HUFF  2,158,423
METHOD OF AND APPARATUS FOR GRINDING TOOTHED WHEELS
Filed Nov. 3, 1937  3 Sheets-Sheet 3
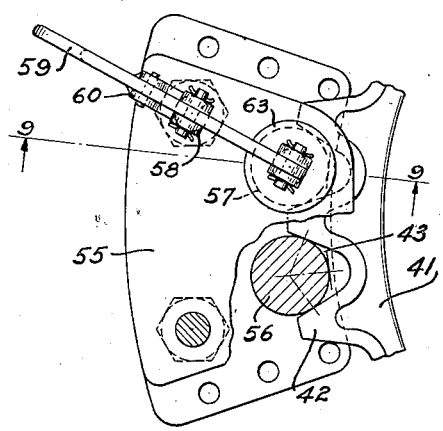
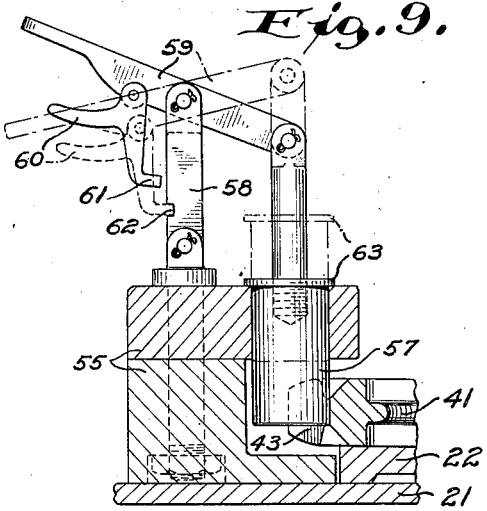
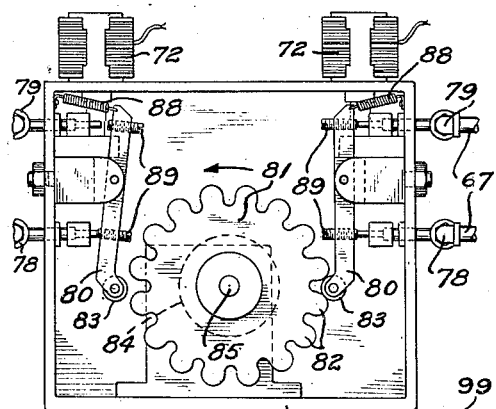
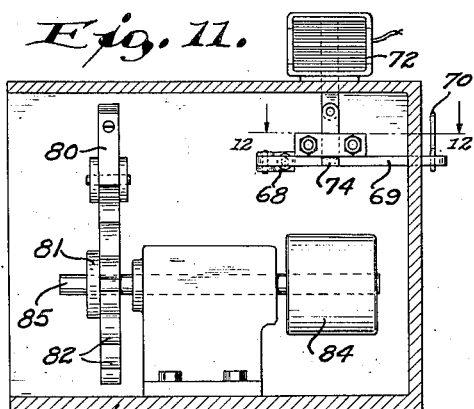
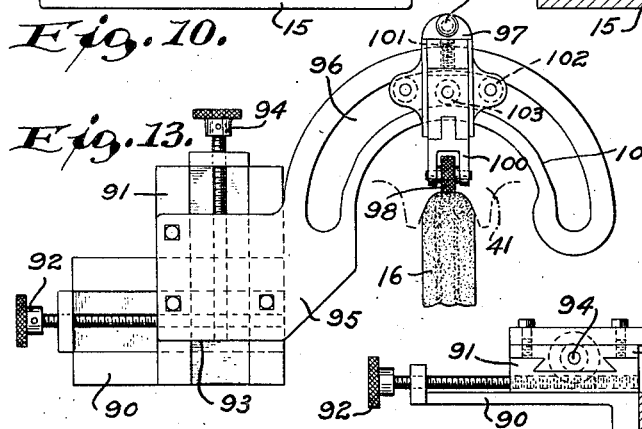
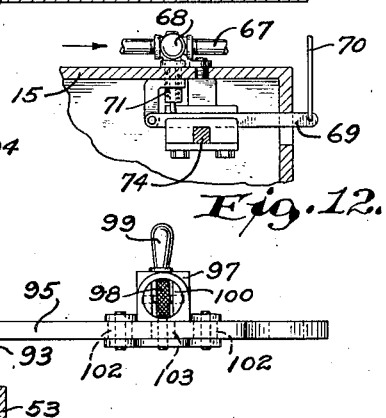
INVENTOR.
Ernest Huff
BY Morsell, Lieber & Morsell
ATTORNEYS.

Patented May 16, 1939

2,158,423

UNITED STATES PATENT OFFICE

2,158,423

METHOD OF AND APPARATUS FOR GRINDING TOOTHED WHEELS

Ernest Huff, Elm Grove, Wis., assignor to Wehr Steel Company, West Allis, Wis., a corporation of Wisconsin Application November 3, 1937, Serial No. 172,532

14 Claims. (Cl. 51—92)

My present invention relates generally to improvements in the art of manufacturing toothed wheels, and relates more specifically to an improved method of and apparatus for grinding the teeth of sprocket wheels or the like.

Generally defined, an object of my present invention is the provision of a simple and efficient method of dressing toothed wheels such as sprockets as by grinding, and the further provision of improved apparatus for automatically and effectively carrying on the improved method.

In the manufacture of relatively large sprocket wheels for supporting the endless tracks of crawler type tractors, it is very desirable to insure relatively accurate coaction between the tread chains and the sprockets in order to obtain smooth travel of the chains with minimum waste of power. The sprockets are usually formed by casting, and the tread chains are ordinarily provided with rollers journalled on the pins which articulably connect the successive tread links, and which coact with the recesses between the successive sprocket teeth. While it has heretofore been common practice to grind these roller receiving recesses of the sprocket wheels, the prior methods were all crude cut-and-try methods, and did not insure accurate dressing of the sprocket recesses as to shape, pitch, and pitch diameter, and without undesirably burning the wheels at the ground surfaces.

It is therefore a more specific object of the present invention to provide a new and useful method of grinding such sprockets so as to provide accurately formed recesses and teeth which have proper pitch and pitch diameter, without burning or scorching the wheels at the finished surfaces.

Another specific object of my invention is the provision of simple and efficient apparatus for rapidly and effectively dressing tractor sprockets, and for insuring uniformity in production.

A further specific object of the invention is to provide an improved grinding machine wherein several sprockets may be ground simultaneously and in an expeditious manner, and which may be conveniently manipulated with minimum attention.

Still another specific object of my present invention is the provision of improved apparatus for accurately finishing toothed wheels such as tractor sprockets, rapidly, safely and at minimum cost.

An additional specific object of this invention is to provide improved mechanism for accurately positioning the sprockets during grinding thereof, and for preventing undesirable mutilation of the sprockets during the grinding operation.

My invention also contemplates provision of simple, compact and readily manipulable mechanism for effectively dressing a grinding wheel so as to insure perfect grinding of the sprockets.

These and other specific objects and advantages will be apparent from the following detailed description.

A clear conception of embodiments of the various features constituting the present improvement, and of the detailed construction of the machinery for carrying on my improved method, may be had by referring to the drawings accompanying and forming a part of this specification wherein like reference characters designate the same or similar parts in the various views.

Fig. 1 is a plan view of a typical endless track supporting sprocket such as may be effectively dressed with my new machine and method;

Fig. 2 is a plan view of the improved apparatus for initially providing each sprocket with a centering support;

Fig. 3 is a central vertical section through the apparatus of Fig. 2;

Fig. 4 is an irregular transverse vertical section through one of the improved grinders, the upper portion of the section being taken at the grinding wheel and the lower portion being taken forwardly of the wheel;

Fig. 5 is an enlarged fragmentary view showing details of construction of the mechanism for predetermining the depth of grinding;

Fig. 6 is a part sectional top view of one of the improved duplex grinding machines;

Fig. 7 is a diagram of the fluid pressure system for actuating the sprocket support;

Fig. 8 is an enlarged part sectional top view of one of the sprocket locking and pitch predetermining mechanisms;

Fig. 9 is a transverse vertical section through the mechanism of Fig. 8, taken along the line 9—9;

Fig. 10 is an enlarged side view of the mechanism for effecting reciprocation of the sprocket supporting carriage during advancement thereof toward the grinding tool;

Fig. 11 is a similarly enlarged part sectional rear view of the mechanism of Fig. 10;

Fig. 12 is a fragmentary section through the control for the carriage reciprocating mechanism, the section being taken along the line 12—12 of Fig. 11;

Fig. 13 is a top view of the rig for accurately dressing the grinding wheels; and Fig. 14 is a front view of the wheel dressing rig.

While my invention has been shown and described herein as being especially useful for the purpose of grinding the teeth of tractor sprockets, it is not the intent to unnecessarily restrict the scope by virtue of such specific adaptation, since some of the novel steps and features may be more generally applicable for other purposes.

Referring to the drawings, and especially to Figs. 4 and 6, the improved duplex grinding machine shown therein comprises in general a main frame 15; a pair of grinding tools or wheels 16 secured to the opposite ends of a shaft 17 which is journalled in bearings 18 carried by the frame 15; a source of power such as an electric motor 19 mounted upon the frame 15 and being drivingly connected with the shaft 17 through a V-belt drive 20 or the like; a sprocket carrier or support 21 mounted for movement upon the frame 15 toward and away from each of the grinding wheels 16; a sprocket centering plate 22 rotatably cooperable with each support 21 and being movable with the latter relative to the corresponding wheel 16; mechanism for locking each of the centering plates 22 in predetermined positions relative to their carrier supports 21; and other mechanism for moving the supports 21 relative to their respective wheels 16 and for effecting reciprocation thereof so as to prevent burning of the work. The two grinding units which are operable by the single motor 19 are of like construction and operation, but are independently operable and manipulable. The description of the details of construction and mode of operation will therefore be confined to one unit in order to avoid possible confusion.

The main frame 15 may be constructed in any suitable manner as of sheet metal plates welded or otherwise firmly united, and the wheels 16, shaft 17 and drive 20 are preferably enclosed in guard housings 23 for protective purposes. The reciprocable support 21 of each grinder unit, is movably mounted upon parallel horizontal rods 24, 25 by means of grooved rollers 26 carried by the support, and the guide rods 24, 25 are preferably supported in an auxiliary frame 27 which may be adjusted vertically by means of jack screws 28, and may also be made horizontally adjustable to insure proper centering of the carriage. The carriage or support 21 of each unit is also provided with an annular bearing bushing 29 which is formed for reception of a cylindrical central projection 30 formed on each centering plate 22, and a vertically movable plunger 31 is slidably mounted in the lower mid-portion of each carriage 21 centrally of the bushing 29 and is cooperable either with the clamping bolt 32 or directly with the plate 22 to elevate the latter away from its support 21, during removal or rotation of the work. Each plunger 31 is operable to lift the corresponding plate 22 by means of a swingably supported lever 33 pivotally mounted at the lowermost portion of the carriage 21 and operable by means of a threaded rod 34 when the carriage is in extreme retracted position, as clearly shown in Fig. 4. The auxiliary frame 27 is also provided with an adjustable threaded stop rod 35 having a rubber end buffer 36 which is cooperable with the depending portion of the carriage or support 21 to limit the travel of each carriage away from its cooperating grinding wheel 16, and each movable support 21 is furthermore provided with spaced parallel lower racks 37 the teeth of which mesh with pinions 38 secured to an actuating shaft 39 journalled in the sub-frame 27 and having an operating lever 40 at one end thereof.

A typical toothed wheel or sprocket 41 of the type especially adapted to be dressed or ground on my improved machine and in accordance with my improved process, is shown in Fig. 1. These sprockets 41 are ordinarily formed by casting and although the castings are quite accurate, it is desirable to grind the teeth 42 thereof so as to insure accuracy in the pitch, pitch diameter and shape of the recesses 43 between the successive sprocket teeth 42. In order to permit such grinding with my improved method, the rough cast sprockets 41 must first be fixedly mounted upon the plates 21, with the sprocket hubs 44 properly centered and clamped in position during the subsequent grinding operations, and such centering may be effected with the apparatus of Figs. 2 and 3. This centering apparatus comprises a table 45 having a central bore for snug reception of the projection 30 while the plate 22 is resting upon the table; a set of four normally stationary blocks 46 spaced about the central bore and being radially adjustable relative to the bore axis by means of cap screws 47 coacting with slots 48 formed in the table 45; an adjustable sprocket centering screw 49 extending radially through each block 46 and being adapted to directly engage the bottoms of the adjacent sprocket recesses 43; and a gage nut 50 associated with each screw 47 between the adjacent block 46 and the manipulating end of the screw 49. The radial adjustability of the blocks 46 with the aid of the cap screws 47 and slots 48 is merely for the accommodation of sprockets 41 having different diameters, and when a sprocket 41 has been initially positioned upon the table 45 with its teeth 42 straddling the adjacent blocks 46, the screws 49 may be manipulated to approximately center the hub 44 after which the nuts 50 can be utilized to more accurately center the same. After such accurate centering of the sprocket 41 relative to the plate 22, the toothed wheel may be clamped to this plate by applying the clamping bolt 32 to the plate 22 and to a top plate 51 and eye-nut 52 as shown in Fig. 3, whereupon the plate 22 with the sprocket 41 clamped thereto may be transferred from the table 45 to either grinding unit with the aid of the eye-nut 52.

When a sprocket 41 clamped to its supporting and centering plate 22 is applied to a supporting carriage 21 as shown in Figs. 4 and 6, the sprocket is surrounded by a wall 53 mounted on each movable support 21 and cooperating with the adjacent grinder wheel guard 23 to confine cooling and lubricating liquid which is constantly discharged against each wheel 16 through a pipe 54. Since the supporting plates 22 are rotatably mounted upon the movable supports 21 by virtue of the coaction between the projections 30 with the bearing bushings 29, some means must be provided for locking the sprockets 41 against rotation during the grinding operations. The mechanism for accomplishing this result is mounted directly on each movable support 21 directly within the guard wall 53 thereof as indicated in Fig. 6, and is shown in detail in Figs. 8 and 9. This locking and positioning means comprises a bracket 55 secured to the adjacent support 21; a pair of locking plungers 56, 57 each of which is independently vertically slidable in a bore in the bracket 55; a fulcrum member 58 pivotally attached to the bracket 55 adjacent to each plunger 56, 57; a lever 59 for actuating each plunger; and a latch 60 pivotally suspended from each lever 59 and having a retaining lug 61 cooperable with a notch 62 in the adjacent member 58 to hold the corresponding locking plunger in inactive position as indicated in dot-and-dash lines in Fig. 9. Each of the plungers 56, 57 is provided with a flange 63 at the upper end thereof, and these flanges 63 are adapted to engage the top of the bracket 55 so as to limit the downward movement of the plungers; and the plungers 56, 57 are movable along parallel axes which are spaced apart a distance precisely equal to the pitch or circumferential distance between the sprocket teeth 42, and are located exactly on the pitch circle of the sprocket 41 when the latter is properly clamped to the centering plate 22. The plungers 56, 57 are adapted to contact the finished recesses 43 of the sprocket 41 at three points only, as clearly shown in Figs. 8 and 9, and only one of these plungers is needed in order to initially lock the sprocket 41 against rotation, but both are required in order to predetermine the pitch distance between successive teeth 42.

As previously indicated, the table 21 of each grinding unit is adapted to be manually displaced relatively to the corresponding wheel 16 by means of the lever 40 attached to the shaft 39 which carries the pinions 38 coacting with the racks 37, and the table 21 may thus be shifted to any position between the grinding wheel 16 and the corresponding limit stop 36. In addition to this manually operable mechanism, I have also provided other mechanism for automatically reciprocating the table 21 of each unit during the grinding operations, this automatic mechanism being shown in detail in Figs. 4, 5, 6, 10 and 11. The mechanism for simultaneously advancing and reciprocating each table comprises a cylinder 64 pivotally suspended from the auxiliary frame 27 and having therein a piston 65 attached to the table 21 near the shaft 39, the piston 65 being constantly urged in one direction by a compression spring 66 located within the cylinder 64; a system of piping 67 for conducting air or other elastic fluid under pressure to and from each cylinder 64; a solenoid controlled main air supply valve 68 adapted to be manually opened by a lever 69 and actuating rod 70, against the action of a valve closing spring 71, to admit fluid under pressure to each piping system; a solenoid 72 adapted to be energized upon closing of a contact device 73 carried by the corresponding auxiliary frame 27, to release a bar 74 and thereby permit closing of the corresponding main valve 68; an adjustable contact 75 carried by a lever 76 which is pivotally suspended from the frame 27 and is operable to complete the energizing circuit of the solenoid 72, by means of a plunger 77 adjustably mounted on the sprocket support 21; inlet and exhaust valves 78, 79 respectively, for the cylinder 64 also associated with the piping 67 beyond the main supply valve 68; an oscillatory lever 80 alternately cooperating with the valves 78, 79 of each set, to admit and exhaust the fluid to and from the cylinder 64; a constantly revolving rotor 81 having peripheral lobes 82 cooperating with rollers 83 carried by both levers 80 to oscillate the latter; and motion transmitting mechanism 84 connecting the shaft 17 with the rotor supporting shaft 85. Each of the grinding units has its own lever 69 and actuating rod 70, so that the mechanisms of the two units may be independently actuated in spite of the fact that the rotor 81 is common to both units.

The carriage or support 21 of each unit may be moved back and forth without interference or obstruction by the cylinder 64 and piston 65, and the plunger 77 is ordinarily freely movable with the carriage 21 until the end plate 86 of the plunger 77 engages the medial portion of the lever 76, whereupon the spring 87 which surrounds the plunger and normally holds the contact 75 out of engagement with the contact device 73, will be compressed, see Fig. 5. After the plate 86 has thus engaged the lever 76, and the main valve 68 has been opened manually, the corresponding solenoid 72 will be deenergized and will hold the valve 68 open until the contact 75 engages the device 73. When such engagement takes place, the solenoid 72 will be energized and will lift its bar 74 to thereby permit the spring 71 to quickly close the valve 68 and thus cut off the fluid pressure supply. But during the entire period that the valve 68 has been open, the corresponding lever 80 will be constantly oscillated to thereby alternately open and close the valves 78, 79 and thus cause the cylinder 64, piston 65 and spring 66 to rapidly reciprocate the sprocket support 21 while permitting the sprocket 41 to constantly advance nearer its grinding wheel 16. The levers 80 are maintained in coaction with the rotor 81 by springs 88, and adjustable set screws 89 insure proper coaction between the levers 80 and the valves 78, 79.

In order to insure accurate grinding of the sprocket recesses 43 and teeth 42 as to shape, the wheels 16 must be dressed occasionally, and for this purpose apparatus such as shown in Figs. 13 and 14 has been provided. This improved dressing apparatus is adapted to quickly and accurately dress the periphery of each wheel 16 to conform with the desired shape of the recesses 43 which are not semi-circular. The dressing rig comprises a lower bracket 90 formed for attachment to the guard wall 53; an intermediate frame 91 slidably adjustable upon the lower bracket 90 by means of an adjusting screw 92; an upper bracket 93 slidably adjustable upon the frame 91 by means of a screw 94 and at right angles to the screw 92; a member 95 secured to the upper bracket 93 and having an arcuate slot 96 therein; an oscillatory carrier element 97 forming a support for a rotary dressing wheel 98 and being movable by means of a handle 99; and a wheel support 100 slidably mounted upon the carrier element 97 and being constantly urged toward the grinding wheel 16 and away from the handle 99 by means of a spring 101. The screws 92, 94 facilitate proper initial positioning of the segment member 95 relative to the grinding wheel 16 preparatory to the dressing operation, and the oscillatory element 97 has guide rollers 102 which coact with the truly circular outer surface of the slot 96, whereas the slidable support 100 has a single intermediate guide roller 103 constantly held in engagement with the inner surface 104 of this slot, the surface 104 being of a shape corresponding to the proper desired shape of the grinding wheel periphery. The improved wheel dressing rig is initially utilized in order to prepare the grinding wheels 16 for use, and this conditioning of the wheels 16 may obviously be accomplished by merely swinging the element 97 and support 100 back and forth along the slot 96, while at the same time manipulating the adjusting screw 94 so as to maintain contact between the wheels 16, 98.

While the normal operation of my improved toothed wheel or sprocket grinding apparatus when carrying on my improved method, should be clearly apparent from the foregoing detailed description, the mode of procedure will again be briefly described. Assuming the grinding wheels 16 to have been properly dressed with the apparatus shown, and the driving motor 19 to be operating, the successive sprockets 41 may be clamped to the plates 22 with the aid of the mechanism shown in Figs. 2 and 3, as previously described, and thereafter applied to either of the grinding units. During such application of a sprocket 41 and plate 22 to a support 21, the latter should be moved outwardly against its buffer block 36 as shown in Fig. 4, and both of the corresponding plungers 56, 57 should be elevated so as to avoid interfering with the sprocket teeth 42 during application of the plate 22 to the carriage 21. The sprocket 41 should then be positioned so as to bring one recess 43 thereof in alinement with the grinding wheel 16, after which the support 21 may be moved inwardly with the aid of the lever 40 and pinions 38 coacting with the racks 37, and the fluid pressure system operated so as to accurately grind the first recess 43. The sprocket 41 should thereafter be withdrawn from the wheel and rotated so as to bring the ground first recess in alinement with the plunger 56 nearest the wheel 16, which plunger should then be lowered so as to lock the sprocket against rotation while the third recess 43 is being ground. This may be followed by grinding of the fourth recess and after the third and fourth recesses 43 have been ground, the sprocket 41 is rotated so as to bring these adjacent ground recesses in alinement with the plungers 57, 56 respectively, whereupon both of the plungers are utilized to lock the sprocket and to maintain proper pitch distances between the successive teeth 42 during the remaining grinding operations which are continued until all recesses 43 have been properly ground.

The improved fluid pressure system for automatically reciprocating each carriage 21 during grinding, operates as follows. The set screw or contact 75 must first be adjusted so as to insure closing of the solenoid energizing circuit when the recesses 43 have been ground to proper depth. When a support 21 has been moved inwardly with the aid of the lever 40 so that the sprocket 41 thereon just touches the adjacent grinding wheel 16, the corresponding control rod 70 is manipulated to shift the lever 69 and to thereby open the main valve 68 and admit fluid under pressure to the piping 67. The lever 69 is freely initially movable because the solenoid actuated bar 74 has been previously lifted by the solenoid 72 and is then resting on the lever; but as the lever 69 opens the valve 68 against the action of the spring 71, the bar 74 drops in back of this lever and positively holds the valve 68 open. The oscillating lever 80 then alternately admits fluid under pressure to the cylinder 64 past the inlet valve 78 and permits subsequent escape of the fluid from the cylinder 64 past the outlet valve 79, thus causing the admitted fluid under pressure and the spring 66 to rapidly reciprocate the carriage 21 and to progressively move the sprocket 41 thereon nearer to the grinding wheel 16. When the grinding has progressed sufficiently to cause the contact 75 to engage the contact device 73, the solenoid 72 will immediately be energized and will lift its bar 74 sufficiently to permit the valve spring 71 to close the valve 68 and to move the lever 69 beneath the end of the bar 74, whereupon the reciprocation of the support 21 and sprocket 41 will cease. After the support 21 has been moved outwardly for rotary adjustment or removal of the sprocket 41, the lifting rig consisting of the threaded rod 34, lever 33, and plunger 31 may be utilized to slightly elevate the plate 22 from the support 21 and to thereafter permit relatively free turning of the projection 30 within the bushing 29, or to permit free removal of the sprocket assemblage. In order to effect removal of the sprocket 41 with its clamping plate 22, the locking pin assemblage including the bracket 55 should be released and removed from the support 21 simultaneously with the plate 22. Since the bracket 55 is merely secured to the support 22 by means of vertical pins from which it is freely vertically removable, such simultaneous removal of the bracket and frame may be readily effected.

From the foregoing detailed description, it will be apparent that the present invention provides an improved method of and apparatus for accurately grinding the teeth of the sprockets 41 as to shape, pitch, and pitch diameter, with minimum effort and without danger of burning or undesirably drawing the temper from the sprockets. The centering mechanism of Figs. 2 and 3 permits accurate clamping of the successive sprockets 41 to the centering plates 22, in a rapid and expeditious manner, and the centering plates 22 subsequently serve to properly position the sprockets upon the supports 21. The locking plungers 56, 57, obviously not only permit positive locking of the sprockets against rotation, but also enable the operator to accurately determine the pitch of the sprocket teeth 42. The grinding rig of Figs. 13 and 14 facilitates dressing of the grinding wheel 16 so as to insure proper shape of the successive grooves 43, and the fluid pressure system for reciprocating the sprockets during the grinding operations, prevents undesirable burning of the sprocket wheels during the grinding operations. The improved grinding machine is so constructed that the supports 21 may be accurately centered and otherwise disposed relative to the grinding wheel 16, and these supports may be readily and quickly manipulated so as to facilitate application and removal of the sprockets to and from the supports. The invention has proven highly practical in actual use, and by providing duplex grinding units, an operator can be engaged in centering one sprocket while another is being ground, thereby making the operation of the machine continuous and enhancing its capacity to a maximum.

It should be understood that it is not desired to limit this invention to the exact details of construction or to the precise steps of the process herein described, for various modifications within the scope of the claims may occur to persons skilled in the art.

I claim:

1. The method of grinding successive recesses between the peripheral teeth of a sprocket, which comprises, supporting the sprocket for rotation about a central axis and for movement in a plane intersecting said axis, locking the sprocket against rotation and advancing the same with a reciprocating motion in the direction of advancement toward a grinding tool until a recess of definite depth has been formed, and thereafter retracting the sprocket from the tool and angularly displacing same about said axis to bring a succeeding recess in alinement with said tool.

2. The method of grinding successive recesses between the peripheral teeth of a sprocket, which comprises, supporting the sprocket for rotation about a central axis and for movement in a plane intersecting said axis, locking the sprocket against rotation and advancing the same with a reciprocating motion in the direction of advancement toward a grinding tool until a recess of definite depth has been formed, thereafter retracting the sprocket from the tool and angularly displacing same about said axis to bring a succeeding recess in alinement with said tool, and repeating the procedure until all of the peripheral recesses have been dressed to the same depth and pitch with respect to said axis.

3. In combination, a grinding tool operable in a definite plane, means for rotatably supporting a wheel for translatory motion of the axis thereof within said plane, means for locking said wheel against rotation about said axis, and means for advancing said supporting means definite distances toward said tool and for simutaneously reciprocating said supporting means in a plane perpendicular to the wheel axis during said advancement until a recess of definite depth has been ground in the wheel periphery.

4. In combination, a grinding wheel, a carriage movable radially toward and away from said wheel and being formed to rotatably support a toothed wheel, means for locking a toothed wheel supported by said carriage in a definite position against rotation, and means for advancing said carriage definite distances radially toward said grinding wheel and for simultaneously reciprocating the carriage in a plane perpendicular to the wheel axis during said advancement.

5. In combination, a grinding wheel rotatable in a plane, a carriage movable toward said wheel and being formed to rotatably support a sprocket with the peripheral recesses thereof successively movable in said plane, means for locking a sprocket supported by said carriage with the successive peripheral recesses of the sprocket centralized with respect to said plane, and means for advancing said carriage toward said wheel and for simultaneously reciprocating the same in the direction of advancement thereof.

6. In combination, a grinding wheel rotatable in a plane, a carriage movable toward said wheel and being formed to rotatably support a sprocket with the peripheral recesses thereof successively movable in said plane, means for locking a sprocket supported by said carriage with the successive peripheral recesses of the sprocket centralized with respect to said plane, means for advancing said carriage toward said wheel and for simultaneously reciprocating the same in the direction of advancement thereof, and means for automatically arresting each advancing movement of said carriage at a definite palce.

7. In combination, a grinding wheel, a sprocket supporting carriage movable toward said wheel, means for mounting a sprocket upon said carriage with each peripheral recess of the sprocket centralized with respect to said wheel, and means for advancing said carriage predetermined distances toward said wheel and for simultaneously reciprocating the carriage in the direction of advancement thereof.

8. In combination, a grinding wheel, a sprocket support movable toward said wheel, means for revolvably mounting a sprocket upon said support with the axis of rotation thereof located substantially in the plane of said wheel, and means simultaneously cooperable with several ground teeth of said sprocket for preventing rotation thereof during subsequent grinding of other teeth and for definitely determining the proper pitch.

9. In combination, a grinding wheel, a sprocket supporting carriage movable toward said wheel, means for revolvably mounting a sprocket upon said support, and independently manipulable pins simultaneously engageable with several ground portions of said sprocket for locking the same against rotation during subsequent grinding operations and for definitely determining the proper pitch.

10. In combination, a grinding wheel, a sprocket supporting carriage movable toward said wheel, means for revolvably mounting a sprocket upon said support independently manipulable pins simultaneously engageable with several ground portions of said sprocket for locking the same against rotation during subsequent grinding operations, and independently functioning members cooperable with several ground teeth of said sprocket for locking said sprocket against rotation and for predetermining the proper pitch during subsequent grinding of other teeth.

11. In combination, a grinding wheel, a sprocket supporting carriage movable toward said wheel, means for revolvably mounting a sprocket upon said support, independently manipulable pins simultaneously engageable with several ground portions of said sprocket for locking the same against rotation during subsequent grinding operations, and a member cooperable with a ground recess between successive teeth of said sprocket to lock the same against rotation and to predetermine the proper pitch during subsequent grinding of other teeth.

12. In combination, a grinding tool, a toothed wheel support movable toward said tool, means for rotatably supporting a toothed wheel for cooperation of its successive teeth with said tool, a locking member cooperable with a tooth of said wheel to prevent rotation thereof, and another locking member simultaneously cooperable with another tooth of said wheel to definitely predetermine the pitch distance between successive teeth during grinding thereof by said tool.

13. In combination, a grinding tool, a toothed wheel support movable toward said tool, means for rotatably supporting a toothed wheel for cooperation of its teeth in succession with said tool, means for locking the toothed wheel to said support, and means for reciprocating said support in a plane intersecting the wheel axis during cooperation of the teeth of the wheel with said tool and for simultaneously advancing the support toward said tool during said reciprocation.

14. The method of grinding successive recesses between the peripheral teeth of a sprocket which comprises, supporting the sprocket for rotation about a central axis, locking the sprocket against rotation about said axis, relatively advancing the sprocket and a grinding tool toward each other in a plane intersecting said axis and simultaneously relatively reciprocating the sprocket and tool in the direction of said advancement until a recess of definite depth has been formed in the sprocket, and thereafter retracting the sprocket and tool from each other and angularly displacing the sprocket about said axis to bring a succeeding recess in alinement with said tool.

ERNEST HUFF.